(12) United States Patent
Wu et al.

(10) Patent No.: US 11,269,098 B2
(45) Date of Patent: Mar. 8, 2022

(54) SPARSE DECONVOLUTION AND INVERSION FOR FORMATION PROPERTIES

(71) Applicant: Halliburton Energy Services, Inc., Houston, TX (US)

(72) Inventors: Xiang Wu, Singapore (SG); Mark Elliott Willis, Katy, TX (US); Wei-Bin Ewe, Singapore (SG); Glenn Andrew Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 78 days.

(21) Appl. No.: 16/617,627

(22) PCT Filed: Aug. 31, 2018

(86) PCT No.: PCT/US2018/049239
§ 371 (c)(1),
(2) Date: Nov. 27, 2019

(87) PCT Pub. No.: WO2020/046392
PCT Pub. Date: Mar. 5, 2020

(65) Prior Publication Data
US 2021/0055436 A1    Feb. 25, 2021

(51) Int. Cl.
*G01V 1/28* (2006.01)
*E21B 47/002* (2012.01)
(Continued)

(52) U.S. Cl.
CPC .......... *G01V 1/282* (2013.01); *E21B 47/0025* (2020.05); *E21B 49/00* (2013.01);
(Continued)

(58) Field of Classification Search
USPC ........................................................... 702/11
See application file for complete search history.

(56) References Cited

U.S. PATENT DOCUMENTS

| | | |
|---|---|---|
| 2004/0199330 A1 | 10/2004 | Routh et al. |
| 2006/0161352 A1* | 7/2006 | Goswami ................. G01V 3/18 |
| | | 702/11 |

(Continued)

FOREIGN PATENT DOCUMENTS

WO    2007058662    5/2007

OTHER PUBLICATIONS

ISRWO International Search Report and Written Opinion for PCT/US2018/049239 dated May 7, 2019.
(Continued)

*Primary Examiner* — Paul D Lee
(74) *Attorney, Agent, or Firm* — John Wustenberg; C. Tumey Law Group PLLC (57) ABSTRACT

The disclosure relates generally to the inversion of geophysical and/or logging measurements for formation evaluation and monitoring. The disclosure may be related to methods of deconvolution and/or inversion of piecewise formation properties. A method for formation evaluation from a downhole tool may comprise disposing a downhole tool into a wellbore, broadcasting a signal into a formation penetrated by the wellbore, recording the signal from the formation with at least one receiver disposed on the downhole tool, computing an objective function, and determining formation properties by minimizing the objective function.

20 Claims, 5 Drawing Sheets

(51) Int. Cl.
*E21B 49/00* (2006.01)
*G01V 1/50* (2006.01)
*G01V 3/38* (2006.01)

(52) U.S. Cl.
CPC .............. *G01V 1/50* (2013.01); *G01V 3/38* (2013.01); *E21B 2200/20* (2020.05); *G01V 2210/161* (2013.01)

(56) References Cited

U.S. PATENT DOCUMENTS

| | | | |
|---|---|---|---|
| 2016/0061986 A1 | 3/2016 | Anand et al. | |
| 2016/0363683 A1 | 12/2016 | Collins et al. | |
| 2017/0075021 A1* | 3/2017 | Thiel | G01V 3/20 |
| 2017/0139065 A1* | 5/2017 | Gentilhomme | G01V 1/282 |
| 2017/0242142 A1 | 8/2017 | Jiao et al. | |
| 2017/0261631 A1* | 9/2017 | Donderici | G01V 3/18 |
| 2017/0322339 A1* | 11/2017 | Wessling | E21B 7/04 |
| 2017/0337302 A1* | 11/2017 | Mezghani | G06F 30/17 |
| 2018/0100950 A1* | 4/2018 | Yao | E21B 47/09 |
| 2018/0130491 A1* | 5/2018 | Mathur | H04S 7/307 |
| 2018/0284309 A1* | 10/2018 | Hirabayashi | G01V 1/46 |
| 2019/0187310 A1* | 6/2019 | Al-Saleh | G01V 1/345 |
| 2020/0033494 A1* | 1/2020 | Patterson | E21B 49/00 |
| 2020/0209425 A1* | 7/2020 | Ewe | G01V 3/20 |

OTHER PUBLICATIONS

C. R. Vogel and M. E. Oman, Fast robust total variation-based reconstruction of noisy, blurred image, IEEE, transactions on image processing, vol. 7, issue 6, p. 813-824 (1998).

S. Osher, M. Burger, D. Goldfarb, J Xu and W. Yin, an iterative regularization method for total variation based image restoration, Multiscale Model. Simul., 4(2), 460-489 (2005).

Y Wang, J. Yang, W. Yin and Y. Zhang, a new alternative minimization algorithm for toal variation image reconstruction, SIM J. Imaging Sciences, vol. 1, No. 3, 248-272 (2008).

Daubechies, I., M. Defrise, and C. De Mol, An iterative thresholding algorithm for linear inverse problems with a sparsity constraint, Communications on pure and applied mathematics, vol. 57, Issue 11, 1413-1457 (2004).

* cited by examiner

SPARSE DECONVOLUTION AND INVERSION FOR FORMATION PROPERTIES

BACKGROUND

Wellbores drilled into subterranean formations may enable recovery of desirable fluids (e.g., hydrocarbons) using a number of different techniques. A logging tool may be employed in subterranean operations to determine wellbore and/or formation properties. Formation evaluation further from a wellbore is a critical step in reservoir characterization and monitoring. Logging tools typically measure the "near-field", or in the proximity of the wellbore. Logging tools are evolving to measure the "far-field", or large distances from the wellbore.

Logging tools may obtain geophysical and/or logging measurements for formation evaluation and monitoring. The geophysical and/or logging measurements may be altered through mathematical schemes, such as an inversion scheme, to determine formation characteristics. Currently, inversions schemes utilized are time consuming to perform and require vast amounts of data. There is a need to perform inversion based methods in a near and/or real time manner during a drilling, logging, and/or production operation. Additionally, inversion schemes are generally specific to a single downhole tool that operates in a specific manner, which increases operation cost across the industry. A single inversion scheme that requires less time to perform, requires less data, and is able to work with data from any number of downhole tools would increase the productivity, reduce operation cost, and/or allow for drilling decisions to be made in hours and not in days and/or weeks.

BRIEF DESCRIPTION OF THE DRAWINGS

These drawings illustrate certain aspects of some examples of the present disclosure, and should not be used to limit or define the disclosure.

DETAILED DESCRIPTION

The present disclosure relates generally to a method of inversion of geophysical and/or logging measurements for formation evaluation and monitoring. More particularly, inversion of measurements from borehole logging tools using methods of deconvolution and/or inversion of piecewise formation properties. The disclosure is applicable to vertical seismic profiling (VSP) data acquired using distributed acoustic sensing (DAS), and from wireline and logging-while-drilling (LWD) resistivity and/or ultrasonic imaging tools. A logging tool may include any number of downhole sub-assemblies, each of which may include sensor configurations, e.g., geophones or hydrophones for seismic sensing, or antennas or electrodes for resistivity sensing.

Figure 1:
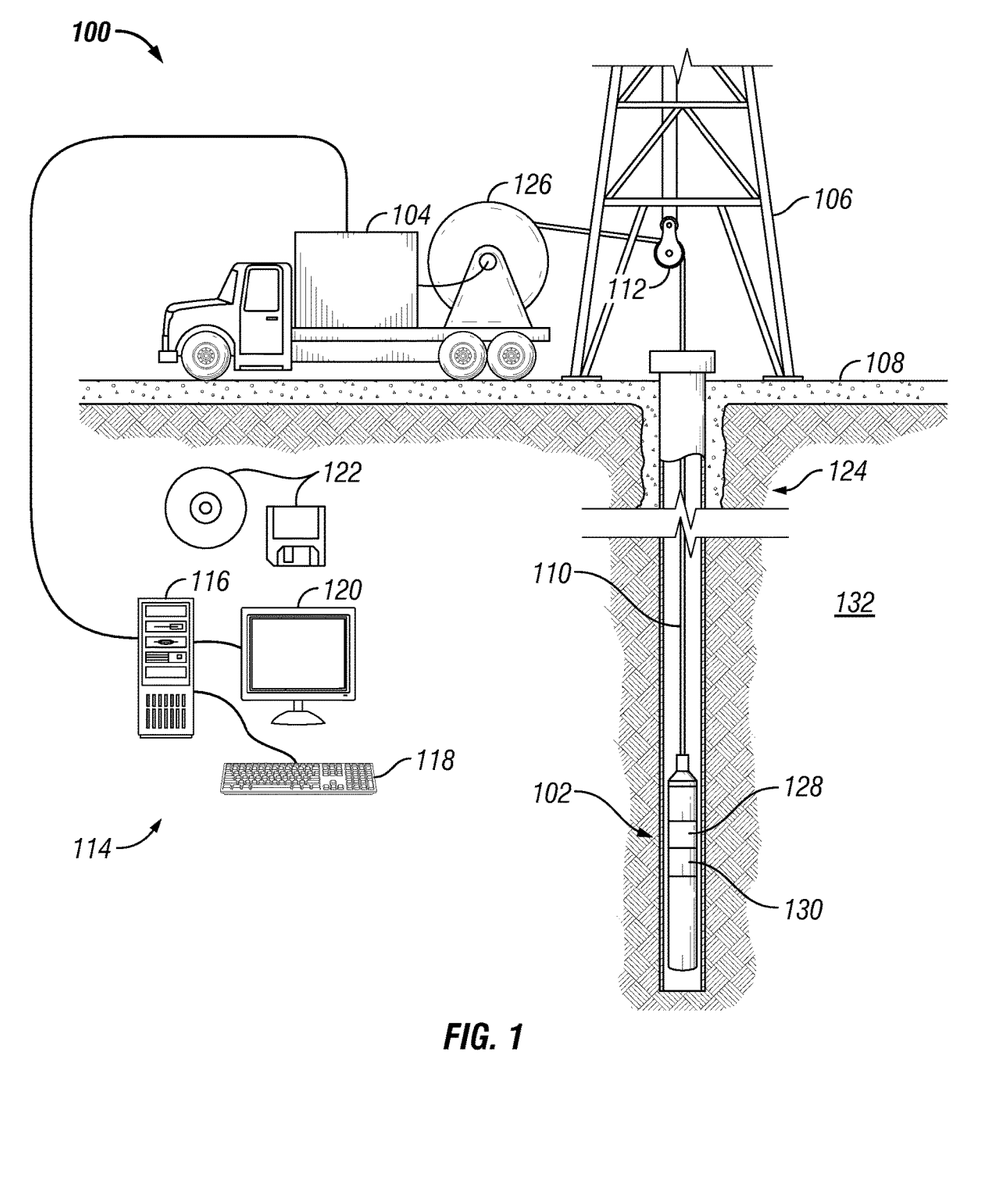
FIG. 1 illustrate an example of a well measurement system.

FIG. 1 illustrates a cross-sectional view of a well measurement system 100. As illustrated, well measurement system 100 may comprise downhole tool 102 attached a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some embodiments, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as a input device 118 (e.g., keyboard, mouse, etc.) and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 106 includes a load cell (not shown) which may determine the amount of pull on conveyance 110 at the surface of borehole 124. Information handling system 114 may comprise a safety valve which controls the hydraulic pressure that drives drum 126 on vehicle 104 which may reels up and/or release conveyance 110 which may move downhole tool 102 up and/or down borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may comprise a transmitter 128 and/or a receiver 130. In examples, downhole tool 102 may operate with additional equipment (not illustrated) on surface 108 and/or disposed in a separate well measurement system (not illustrated) to record measurements and/or values from formation 132. During operations, transmitter 128 may broadcast a signal from downhole tool 102. Any suitable transmitter 128 may be used, including, but not limited to, an acoustic transmitter, ultra-sonic transmitter, an electrode, a button electrode, and/or the like. Transmitter 128 may be connected to information handling system 114, which may further control the operation of transmitter 128. Additionally, receiver 130 may measure and/or record signals broadcasted from transmitter 128. Any suitable receiver 130 may be used, including, but not limited to, geophones, accelerometers, acoustic receiver, presser sensor, ultra-sonic receiver, electrode, and/or a button electrode and/or the like. Receiver 130 may transfer recorded information to information handling system 114. Information handling system 114 may control the operation of receiver 130. For example, the broadcasted signal from transmitter 128 may be reflected by formation 132. The reflected signal may be recorded by receiver 130. The recorded signal may be transferred to information handling system 114 for further processing. In examples, there may be any suitable number of transmitters 128 and/or receivers 130, which may be controlled by information handling system 114. Information and/or measurements may be processed further by information handling system 114 to determine properties of borehole 124, fluids, and/or formation 132.

Figure 2:
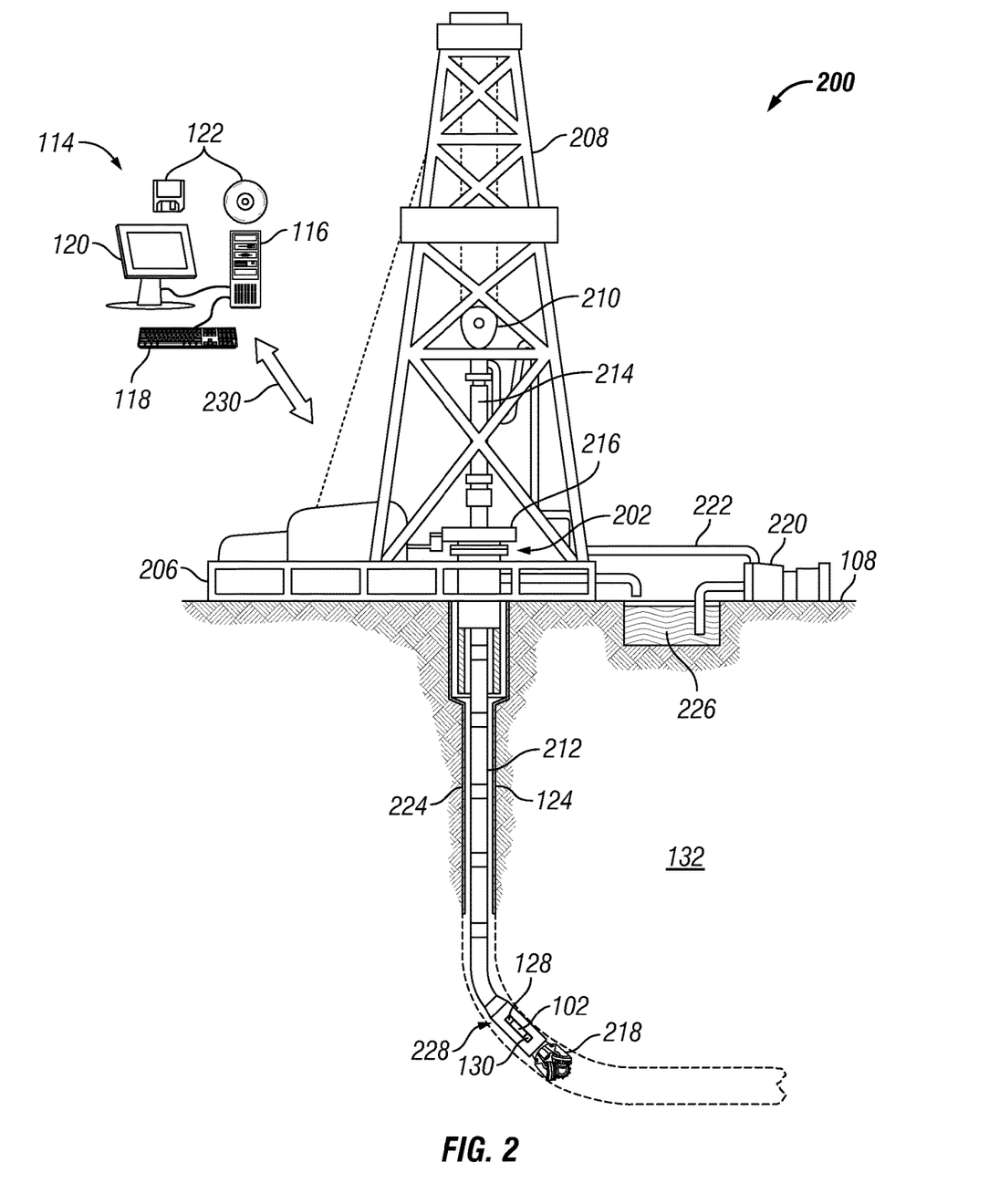
FIG. 2 illustrates another example of a well measurement system.

FIG. 2 illustrates an example in which downhole tool 102 (Referring to FIG. 1) may be disposed in a drilling system 200. As illustrated, borehole 124 may extend from a wellhead 202 into a formation 132 from surface 108 (Referring to FIG. 1). Generally, borehole 124 may include horizontal, vertical, slanted, curved, and other types of wellbore geometries and orientations. Borehole 124 may be cased or uncased. In examples, borehole 124 may comprise a metallic material. By way of example, the metallic member may be a casing, liner, tubing, or other elongated steel tubular disposed in borehole 124.

As illustrated, borehole 124 may extend through formation 132. As illustrated in FIG. 2, borehole 124 may extending generally vertically into the formation 132, however borehole 124 may extend at an angle through formation 132, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various subterranean formations 204. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108. Drill bit 218 may be a part of bottom hole assembly 228 at distal end of drill string 212. Bottom hole assembly 228 may further comprise downhole tool 102. Downhole tool 102 may be disposed on the outside and/or within bottom hole assembly 228. Downhole tool 102 may comprise a plurality of transmitters 128 and receivers 130. Downhole tool 102 and/or the plurality of transmitters 128 and receivers 130 may operate and/or function as described above. As will be appreciated by those of ordinary skill in the art, bottom hole assembly 228 may be a measurement-while drilling (MWD) or logging-while-drilling (LWD) system.

Without limitation, bottom hole assembly 228, transmitter 128, and/or receiver 130 may be connected to and/or controlled by information handling system 114, which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a communication line (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116, a video display 120, an input device 118 (e.g., keyboard, mouse, etc.), and/or non-transitory computer-readable media 122 (e.g., optical disks, magnetic disks) that may store code representative of the methods described herein. In addition to, or in place of processing at surface 108, processing may occur downhole.

Bottom hole assembly 228 may comprise a transmitter 128 and/or a receiver 130. In examples, bottom hole assembly 228 may operate with additional equipment (not illustrated) on surface 108 and/or disposed in a separate well measurement system (not illustrated) to record measurements and/or values from formation 132. During operations, transmitter 128 may broadcast a signal from bottom hole assembly 228. Transmitter 128 may be connected to information handling system 114, which may further control the operation of transmitter 128. Additionally, receiver 130 may measure and/or record signals broadcasted from transmitter 128. Receiver 130 may transfer recorded information to information handling system 114. Information handling system 114 may control the operation of receiver 130. For example, the broadcasted signal from transmitter 128 may be reflected by formation 132. The reflected signal may be recorded by receiver 130. The recorded signal may be transferred to information handling system 114 for further processing. In examples, there may be any suitable number of transmitters 128 and/or receivers 130, which may be controlled by information handling system 114. Information and/or measurements may be processed further by information handling system 114 to determine properties of borehole 124, fluids, and/or formation 132.

As previously described with respect to FIGS. 1 and 2, measurements may be obtained using downhole tool 102. These measurements may be measurements of resistivity, frequency, acoustic waves, ultrasound waves, current, voltage, and/or the like. The measurements may be processed to determine properties of the formation 132, such as formation thickness, boundaries between formation, distance between formation boundaries, resistivity of a formation, type of formation, and/or the like. Determining formation characteristics may be performed by an inversion scheme, which may include many different algorithms. Formation characteristics may be expressed in an inversion scheme in any number of ways. For example, a physical property of a formation 132 may be expressed as u(d) at certain depth d, wherein a forward model of formation 132 may be expressed as:

$$D(d)=F(u(d)) \tag{1}$$

where $F(\cdot)$ is a generally a forward modeling operator that transfers the physical properties of formation 132 to observations D(d). In examples, u(d) may be a reflection, a resistivity, a velocity models, etc., and the corresponding observation D may be seismic data, measured voltages for EM resistivity logging tool, ultrasonic reflection etc. However, in examples, prior knowledge of formation 132 might be available, for example the number of layers of a certain formation section, or the thickness of a layer. The properties of formation 132 might be stable or of minimal variation within the layer. However, the properties of formation 132 may change dramatically on the interfaces. Such prior knowledge may be real or presumed and may help constrain or reduce the inverse problem.

One common variable setting, a layer-wise description, for VSP may be $\langle d_i, u_i \rangle$ pairs, where $d_i$ is the thickness of the ith layer, $u_i$ is the property quantity (e.g., velocity or impedance) of the ith layer and i=1, 2, . . . , N, where N is a hyper-parameter indicating how many layers there are in formation 132 of interest. The problem is then transformed to a cascaded version. The hyper-parameter needs to be determined before inverting/deconvolving for $\langle d_i, u_i \rangle$. Alternatively, a mesh-grid version of the variable setting u(d) may be adopted, where d=i$\Delta$d and $\Delta$d is the resolution of depth. Disadvantages of the mesh-grid version over the layer-wise description may include a large increment of variables for the mesh-grid parameterization, especially in high dimensions. The resolution of $\Delta$d may cause the number of variables to increase from N to $$\frac{d}{\Delta d}.$$

Additionally the mesh-grid parameter setting u(d) may not provide a constant value within a layer because all u(d) are variable. Efforts have been made to penalize the correlation between "neighboring" variables, such as total variance methods, etc. The idea of those methods is to minimize the derivative of the variables (or difference of the neighboring variables) while minimizing the misfit between the observation and the modelled data.

Total variation ("TV") regularization methods provide objective functions as an unconstrained minimizer. The objective function may be written as:

$$f(u)=\tfrac{1}{2}\|D-\tilde{F}u\|_2+\lambda|\nabla u|_1 \quad (2)$$

where $\tilde{F}$ is the matrix representation of $F(\cdot)$, and $\lambda$ is the strength parameter balancing the penalization between L1-norm and L2-norm. $\nabla$ denotes the gradient of variables, and $|\cdot|_1$ and $\|\cdot\|_2$ denote the L1-norm and L2-norm of the within expression, respectively. Note that D and u are functions of spatial coordinate d, and we simplify the notations by not showing the variable d. The gradient of increment of u in Equation (2) gives:

$$H_n = \tilde{F}^T\tilde{F} + \lambda\nabla\frac{\nabla u}{|\nabla u|} \quad (3)$$

where $\cdot^T$ denotes the transpose of an operator (in matrix representation). Regardless of which approach to solve Equation (3) is used, it may be required to compute the derivative of the variables followed by another round of divergence, as shown in the second term of Equation (3). Alternatively, a method similar as the dual method in solving the TV problem may be used. The method treats the derivative of the variables w as another set of independent variables, and the objective function becomes:

$$f(u) = \frac{1}{2}\|D-\tilde{F}u\|_2 + \frac{\lambda}{2}\|w-\tilde{D}u\|_2 + \lambda\mu|w|_1 \quad (4)$$

where $\tilde{D}$ is the matrix representation of the derivative operator. $\mu$ is another strength parameter that balances the penalization of the L1-norm of the variable derivative and the L2-norm of the misfit of the derivative definition. Equation (4) complicates the computation of L2-norm but dramatically simplifies the L1-norm expression. Bayesian shrinkage or Bayesian probability maximization methods, together with alternated iterations between u and w, may be applied to solve the objective function. However, this optimization problem includes two parameters and two kinds of variables that may have difference in sensitivities, and thus the choice of the strength parameters might become important.

As disclosed below, a deconvolution/inversion-based approach may be utilized to solve the piecewise optimization problem with linear and nonlinear operators. For example, consider a (quasi-) linear optimization problem or a time-invariant deconvolution problem:

$$D=\tilde{F}u+n \quad (5)$$

where n is additive Gaussian noise. The derivative of Equation (5) with respect to the spatial coordinates d may be expressed as:

$$D'=\tilde{F}u'+n'. \quad (5)$$

Hence, the need to penalize the piecewise-ness of u straightforwardly becomes to penalize the sparseness of its derivative u'. Differentiation of the observation is first applied before carrying out the minimization. Let w=u', the objective function could be written as:

$$f(u)=\tfrac{1}{2}\|D'-\tilde{F}w\|_2+\lambda|w|_1 \quad (7)$$

Several solvers may be used to solve for w, for example Bayesian Shrinkage approaches or a solver for large-scale sparse reconstruction ("SPGL1"). As disclosed below, an adopted iterative the soft-thresholding method is utilized as an example, which is a type of the Bayesian Shrinkage method, to minimize the objective function given in Equation (7). It should be noted that the actual deconvolution/inversion scheme disclosed herein does not restrain the inversion approaches which may be utilized.

In examples, the operator $\tilde{F}$ might be nonlinear for time-variant convolution and nonlinear forward modeling operator, i.e. $\tilde{F}$ is a function of the variable u. Moreover, observation D may be contaminated by strong noise n, which may lead its derivative being dominated by the derivative of noise n' (Equation (6)). Additionally another transformation w=u', and u=∫w·dx may be utilized with replacement of the variable u by w, and the objective function for penalizing L1-norm of the derivative of the variable becomes:

$$f(w)=\tfrac{1}{2}\|D-\tilde{F}Gw\|_2+\lambda|w|_1 \quad (8)$$

where G is an indefinite integration operator. Let $P=\tilde{F}G$, and the problem is nominally reduced to:

$$f(w)=\tfrac{1}{2}\|D-Pw\|_2+\lambda|w|_1 \quad (9)$$

Similar as solving the objective function in Equation (7), the objective function in Equation (9) may be solved. However, be note that $P^T$ is required in all the mentioned solvers, and $P^T=G^T\tilde{F}^T$. Specifically, $$\begin{cases} Gw = \int_0^d w\cdot dx \\ G^Tw = \int_a^{d_{max}} w\cdot dx \end{cases} \quad (10)$$

Figure 3:
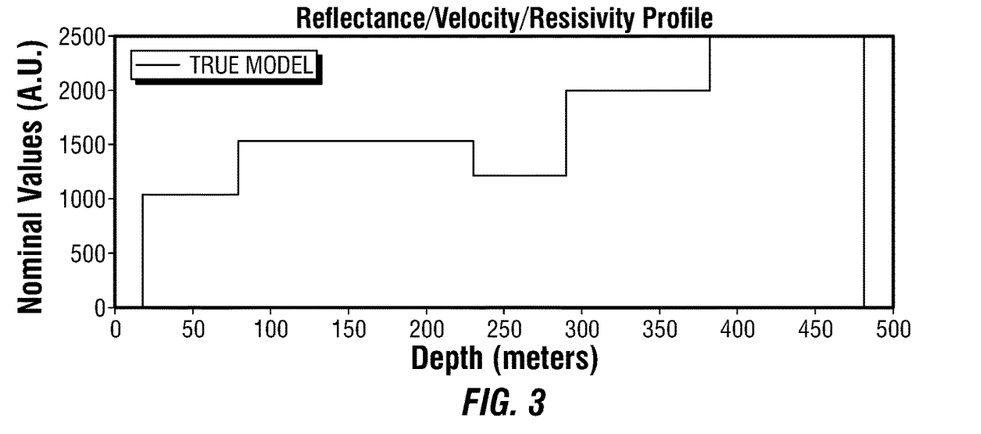
FIG. 3 illustrates a graph of forward model of a velocity profile at a depth.
Figure 4:
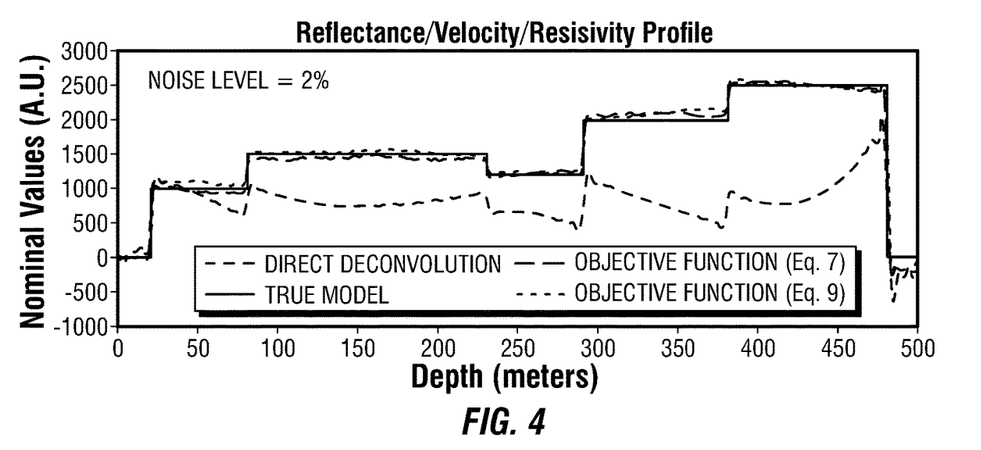
FIG. 4 illustrates a graph of a forward model of velocity profile at a depth compared to actual measurements with 2% of noise.
Figure 5:
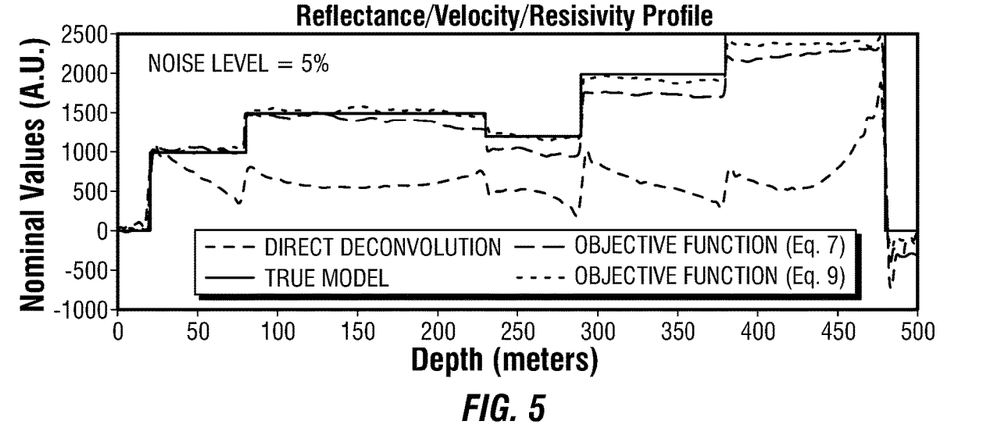
FIG. 5 illustrates a graph of a forward model of velocity profile at a depth compared to actual measurements with 5% of noise.
Figure 6:
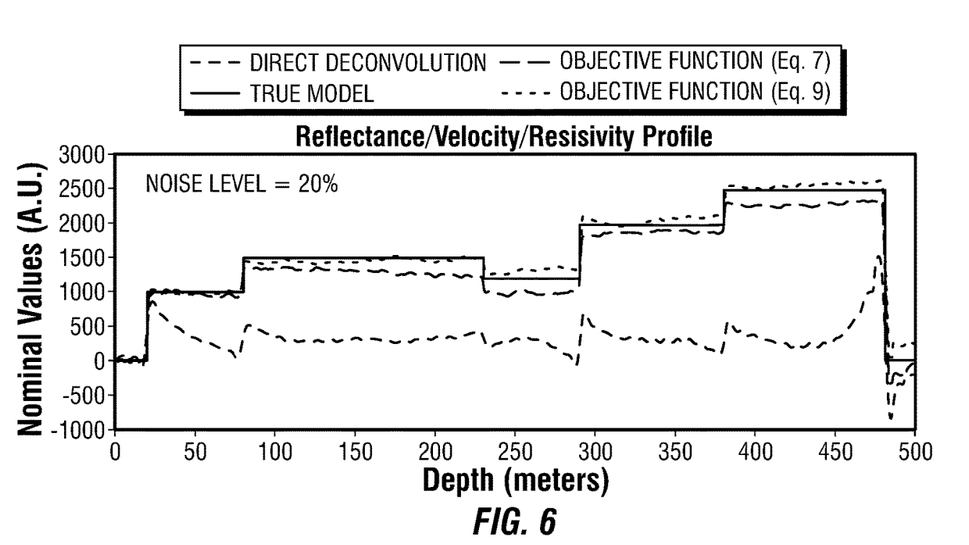
FIG. 6 illustrates a graph of a forward model of velocity profile at a depth compared to actual measurements with 20% of noise.
Figure 7:
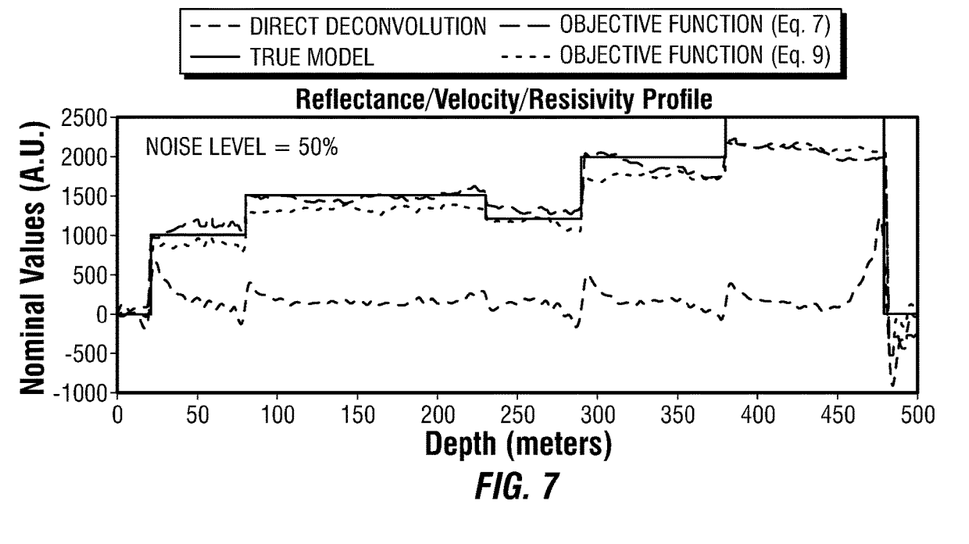
FIG. 7 illustrates a graph of a forward model of velocity profile at a depth compared to actual measurements with 50% of noise.
Figure 8:
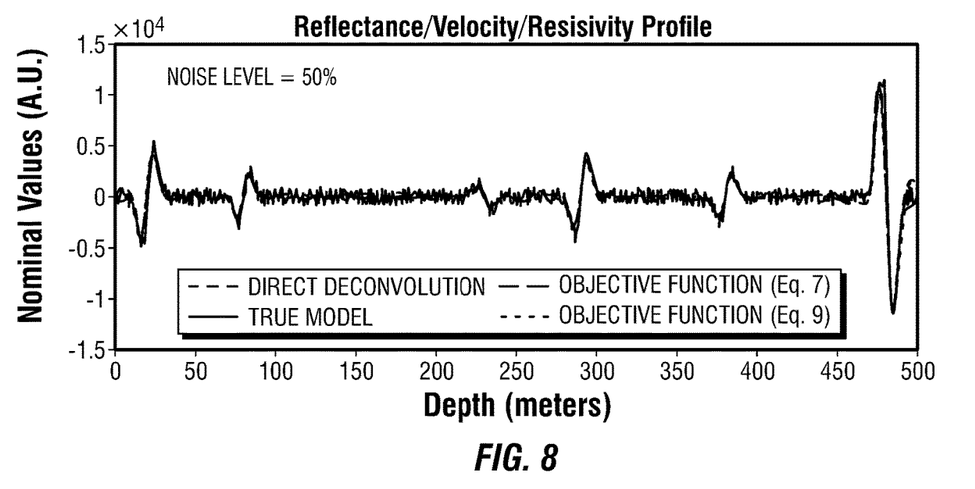
FIG. 8 illustrates a graph of direct deconvolution with 50% of noise.
Figure 9:
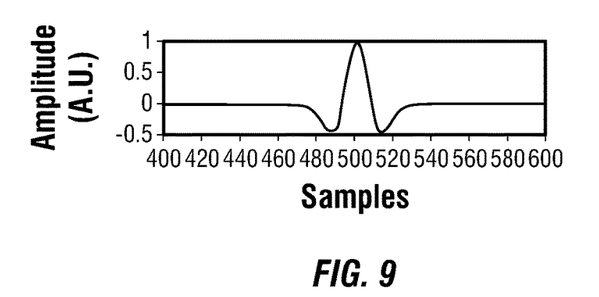
FIG. 9 illustrates a wavelet for recovering an observation of the graph in FIG. 8.

To solve for the variable $u_{opt}$, the inverse operator is applied, given by $u_{opt}=Gw_{opt}=\int_0^d w_{opt}\cdot dx$, where $\cdot_{opt}$ denotes the optimal values of a variable. Below is an example of sparse deconvolution, thus $\tilde{F}$ or $F(\cdot)$ denotes the convolution operator. A one dimensional velocity (or reflectance, resistivity, etc.) model with arbitrary unit (A. U.) is shown in FIG. 3. The spatial sampling interval is one meter. The additive noise is Gaussian, and its amplitude level ranges from 2%~50% of the RMS amplitude of the observation without loss of generality. In examples, a high density of sensors or highly sampled data points may constrain the properties of formation 132 (e.g., Referring to FIGS. 1 and 2), e.g., velocity, reflectance or resistivity, to be minimally changed within a formation layer. In examples, this may allow for abrupt changes on the boundary of formation layers.

To solve the objective function of Equation (7) and Equation (9), the Bayesian Shrinkage approach may be used as the deconvolution solver. The solutions of the objective function Equation (7) and Equation (9), using a single observation data set but with different noise levels are shown in FIGS. 4-7. Comparisons have been made among the solutions to the objective functions of Equation (7) and Equation (9). FIGS. 4-7 compare the direct deconvolution result and the true model.

FIGS. 4-7 illustrate the deconvolution results obtained from the objective functions in Equations (7) and (9), with added noise level from 2% to 50%. They closely match to the true model, although there may be some deterioration in the examples with high noise contamination. However, even in these cases, the boundary of the layers may be easily identified from the deconvolution results using Equations (7) and (9).

In contrast, the direct deconvolution approach only works for extremely low noise levels (e.g., 0.01%), and it provides suboptimal results for the noise level. Obtained unreasonable solutions with sparse constraint placed onto the variable itself. Thus, this approach may not be viable. Comparing the deconvolution results from objective Equations (7) and (9), each result may be comparable for low noise levels (e.g., 2%~5%), but the results from objective Equation (9) may be slightly superior when the noise level is higher. The reason is that the observation, D', in objective Equation (7) is severely dominated by n' due to the high incoherence of noise. Even though the inverted model variables in FIG. 5 differ from each other, in FIG. 6 the forward modeled data using the inverted model variables are similar. This indicates that minimizing the misfit between the observation and the forward modelled data may not provide desired optimal, i.e. layer-wise, results. Instead, applying strong regularization on the variables may allow for finding a suitable layer-wise model.

The above example illustrates the idea of deconvolution (as well as inversion) of layer-wise formation properties. Note that the approach using objective Equation (7) may be used for (quasi-) linear inversion or (quasi-) time-invariant deconvolution while the approach using objective Equation (9) may be used for both linear and nonlinear problems, including time-variant deconvolution. The proposed two approaches have several advantages over the existing TV approaches. The proposed approaches are much faster because the computation of Hessian and its inverse is exempted. The proposed approaches have very fast iterative solvers (e.g. Bayesian Shrinkage) which require very few numbers of iterations. The proposed approaches do not involve a differential/difference operator in the objective function so that it is very resistant to noise. In operations, this equation is able to be utilized across a wide number of downhole tools in real-time resistivity inversion in electromagnetic tools, reflectance and velocity inversion in acoustic sensing tools, and/or in seismic processing.

Benefits from this process are that results from the deconvolution and inversion increases accuracy, imaging, and locating a formation boundary in a shorter amount of time. For example, in borehole seismic services, the equations improve image processing for either geophone or distributed acoustic sensing. During imaging operations, the equations enhance image quality in oil based mud imaging with resistivity, ultrasonic imaging, water based mud imaging, and in circumferential acoustic scanning. Furthermore, the equations improve the accuracy in determining the distance-to-bed boundaries through inversion and in identifying multi-layer boundaries through inversion.

Additionally, besides the velocity application described above, the proposed approaches may have a wide scope of potential applications for resistivity inversion in electromagnetic resistivity logging tools (without assumption of layer numbers and depth), improving spatial resolution in ultrasonic, resistivity, MNR, or nuclear images, reflectance and velocity inversion in acoustic sensing tools, and in seismic processing.

Advantages over current approaches for inverting to determine formation layers and layer thickness are that mesh-grid parameter setting only have one type of parameter u(d), where d is the meshed grid. In contrast with current approaches, the $\langle d_i, u_i \rangle$ setting has two types of parameters, and may have different sensitivities during inversion/deconvolution. Thus, in current approaches, a detailed parameter renormalization or sensitivity analysis is needed in the inversion procedure. Additionally the disclosed equations do not require a hyper-parameter. Furthermore, $\Delta d$ specifies the resolution of u(d), and may be determined in advance and upon request, in another words, the choice of $\Delta d$ may vary the resolution of inverted/deconvolved formation properties but does not affect its accuracy.

This method and system may include any of the various features of the compositions, methods, and system disclosed herein, including one or more of the following statements.

Statement 1. A method for formation evaluation from a downhole tool comprising: disposing a downhole tool into a wellbore; broadcasting a signal into a formation penetrated by the wellbore; recording the signal from the formation with at least one receiver disposed on the downhole tool; computing an objective function from the signal; and determining formation properties by minimizing the objective function.

Statement 2. The method of statement 1, wherein the objective function is linear optimization or time-invariant deconvolution.

Statement 3. The method of statement 2, further comprising identifying the objective function as a conversion of a Total Variation-formed objective function to a L1-norm regularized L2-norm objective function by taking a derivative of the objective function.

Statement 4. The method of statement 3, further comprising solving the minimization of the objective function with a soft-thresholding or a Bayesian Shrinkage.

Statement 5. The method of statement 1, wherein the objective function is piecewise nonlinear for time-variant convolution and forward modeling operator.

Statement 6. The method of statement 5, further comprising identifying the objective function as a conversion of a Total Variation-formed objective function to a L1-norm regularized L2-norm objective function by combining the forward modeling operator with a convolution operator.

Statement 7. The method of statement 6, further comprising solving the minimization of the objective function with a soft-thresholding or a Bayesian Shrinkage.

Statement 8. The method of statement 6, wherein the convolution operator is an indefinite integral of a variable from 0 to d, and/or optionally, wherein the convolution operator is an indefinite integral of the variable from d to $d_{max}$, wherein $d_{max}$ is an upper bound of an area of interest.

Statement 9. The method of statement 8, further comprising integrating the indefinite integral by applying an inverse operator.

Statement 10. A well measurement system for measuring formation properties comprising: a downhole tool, wherein the downhole tool comprises: a receiver; and a transmitter; a conveyance, wherein the conveyance is attached to the downhole tool; an information handling system wherein the information handling system is connected to the downhole tool and operable to compute an objective function from the single and determine one or more formation properties by minimizing the objective function.

Statement 11. The system of statement 10, wherein the objective function is linear optimization or time-invariant deconvolution.

Statement 12. The system of statement 11, wherein the information handling system is further configured to identify the objective function as a conversion of a Total Variation-formed objective function to a L1-norm regularized L2-norm objective function by taking a derivative of the objective function.

Statement 13. The system of statement 12, wherein the information handling system is further configured to solve the minimization of the objective function with a soft-thresholding or a Bayesian Shrinkage.

Statement 14. The system of statement 10, wherein the objective function is piecewise nonlinear for time-variant convolution and a forward modeling operator.

Statement 15. The system of statement 14, wherein the information handling system is further configured to identify the objective function as a conversion of a Total Variation-formed objective function to a L1-norm regularized L2-norm objective function by combining the forward modeling operator with a convolution operator.

Statement 16. The system of statement 15, wherein the information handling system is further configured to solve the minimization of the objective function with a soft-thresholding or a Bayesian Shrinkage.

Statement 17. The system of statement 15, wherein the convolution operator is an indefinite integral of a variable from 0 to d, and/or optionally, wherein the convolution operator is an indefinite integral of the variable from d to wherein $d_{max}$ is an upper bound of an area of interest.

Statement 18. The system of statement 17, wherein the information handling system is further configured to integrate the indefinite integral by applying an inverse operator.

Statement 19. The system of statement 10, wherein the information handling system is further configured to display the one or more formation properties with a vertical seismic profile.

Statement 20. The system of statement 10, wherein the downhole tool is an ultrasonic imaging tool.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for formation evaluation from a downhole tool comprising:
    disposing the downhole tool into a wellbore;
    broadcasting a signal into a formation penetrated by the wellbore;
    recording the signal from the formation with at least one receiver disposed on the downhole tool;
    computing an objective function from the signal wherein the objective function is a convolution between the signal and one or more formation parameters; and
    determining one or more formation properties by minimizing the objective function.

2. The method of claim 1, wherein the convolution is linear optimization or time-invariant.

3. The method of claim 2, further comprising identifying the convolution as a conversion of a total variation-formed objective function to a L1-norm regularized L2-norm convolution by taking a derivative of the convolution.

4. The method of claim 3, further comprising solving the minimization of the convolution with a soft-thresholding or a Bayesian Shrinkage.

5. The method of claim 1, wherein the convolution includes a nonlinear forward modeling operator.

6. The method of claim 5, further comprising identifying the objective function as a conversion of a total variation-formed objective function to a L1-norm regularized L2-norm objective function by combining the forward modeling operator with a convolution operator.

7. The method of claim 6, further comprising solving the minimization of the objective function with a soft-thresholding or a Bayesian Shrinkage.

8. The method of claim 6, wherein d is depth of the downhole tool and the convolution operator is an indefinite integral of a variable from 0 to d, and/or, wherein the convolution operator is an indefinite integral of the variable from d to $d_{max}$, wherein $d_{max}$ is an upper bound of an area of interest.

9. The method of claim 8, further comprising integrating the indefinite integral by applying an inverse operator.

10. A well measurement system for measuring formation properties comprising:
    a downhole tool, wherein the downhole tool comprises:
        a receiver; and
        a transmitter;
    a conveyance, wherein the conveyance is attached to the downhole tool;

an information handling system wherein the information handling system is connected to the downhole tool and operable to compute an objective function from the signal, wherein the objective function is a convolution between the signal and one or more formation parameters; and determine one or more formation properties by minimizing the objective function.

11. The system of claim 10, wherein the convolution is linear optimization or time-invariant.

12. The system of claim 11, wherein the information handling system is further configured to identify the convolution as a conversion of a total variation-formed objective function to a L1-norm regularized L2-norm convolution by taking a derivative of the convolution.

13. The system of claim 12, wherein the information handling system is further configured to minimize the convolution to obtain one or more formation properties with soft-thresholding or a Bayesian Shrinkage.

14. The system of claim 10, wherein the convolution includes a nonlinear forward modeling operator.

15. The system of claim 14, wherein the information handling system is further configured to identify the objective function as a conversion of a total variation-formed objective function to a L1-norm regularized L2-norm objective function by combining the forward modeling operator with a convolution operator.

16. The system of claim 15, wherein the information handling system is further configured to solve the minimization of the objective function with a soft-thresholding or a Bayesian Shrinkage.

17. The system of claim 15, wherein d is depth of the downhole tool and the convolution operator is an indefinite integral of a variable from 0 to d, and/or, wherein the convolution operator is an indefinite integral of the variable from d to $d_{max}$, wherein $d_{max}$ is an upper bound of an area of interest.

18. The system of claim 17, wherein the information handling system is further configured to integrate the indefinite integral by applying an inverse operator.

19. The system of claim 10, wherein the information handling system is further configured to display the one or more formation properties with a vertical seismic profile.

20. The system of claim 10, wherein the downhole tool is an ultrasonic imaging tool.

* * * * *

UNITED STATES PATENT AND TRADEMARK OFFICE
CERTIFICATE OF CORRECTION

PATENT NO. : 11,269,098 B2
APPLICATION NO. : 16/617627
DATED : March 8, 2022
INVENTOR(S) : Xiang Wu et al.

Page 1 of 1

It is certified that error appears in the above-identified patent and that said Letters Patent is hereby corrected as shown below:

In the Specification

Column 8, equation 7 please remove "f(u)" and replace with --f(w)--.

In the Claims

Claim 1, Line 32 please remove "determining one or more" and replace with --determining the one or more--.

Signed and Sealed this
Tenth Day of May, 2022

Katherine Kelly Vidal
*Director of the United States Patent and Trademark Office*